US011760028B2

(12) United States Patent
Tanchak et al.

(10) Patent No.: US 11,760,028 B2
(45) Date of Patent: Sep. 19, 2023

(54) SYSTEM AND METHOD FOR CALIBRATING LAG TIME IN A THREE-DIMENSIONAL OBJECT PRINTER

(71) Applicant: Xerox Corporation, Norwalk, CT (US)

(72) Inventors: Rachel L. Tanchak, Rochester, NY (US); Erwin Ruiz, Rochester, NY (US); Brendan McNamara, W. Henrietta, NY (US); Piotr Sokolowski, Webster, NY (US); Jack G. Elliot, Penfield, NY (US); Ka H. Fung, Rochester, NY (US); Derek A. Bryl, Webster, NY (US); Douglas E. Proctor, Rochester, NY (US); Christopher T. Chungbin, Rochester, NY (US); Peter M. Gulvin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 122 days.

(21) Appl. No.: 17/163,355

(22) Filed: Jan. 30, 2021

(65) Prior Publication Data

US 2022/0242048 A1    Aug. 4, 2022

(51) Int. Cl.
| | | |
|---|---|---|
| *B29C 64/393* | (2017.01) | |
| *B29C 64/112* | (2017.01) | |
| *B33Y 50/02* | (2015.01) | |
| *B33Y 30/00* | (2015.01) | |
| *B33Y 10/00* | (2015.01) | |

(52) U.S. Cl.
CPC .......... *B29C 64/393* (2017.08); *B29C 64/112* (2017.08); *B33Y 10/00* (2014.12); *B33Y 30/00* (2014.12); *B33Y 50/02* (2014.12)

(58) Field of Classification Search
CPC .. B29C 64/393; B29C 64/384; B41J 2/04505; B41J 2/04508; B41J 2/04558; B41J 2/2135; B41J 11/008; B41J 19/142; H04N 1/6044
See application file for complete search history.

(56) References Cited

U.S. PATENT DOCUMENTS

| | | | |
|---|---|---|---|
| 2006/0111807 A1* | 5/2006 | Gothait ................. | B29C 64/393 |
| | | | 700/119 |
| 2010/0309241 A1* | 12/2010 | Kwon ................... | B41J 29/393 |
| | | | 347/14 |
| 2011/0074860 A1 | 3/2011 | Saettel et al. | |
| 2017/0334195 A1* | 11/2017 | Brassil .................. | B41J 2/2135 |
| 2018/0093420 A1 | 4/2018 | Roberts et al. | |
| 2018/0150047 A1 | 5/2018 | Shapiro | |
| 2018/0150062 A1 | 5/2018 | Shapiro | |
| 2018/0239997 A1* | 8/2018 | Fukui ................... | H04N 1/0071 |
| 2019/0152218 A1 | 5/2019 | Stein et al. | |
| 2020/0094589 A1* | 3/2020 | Yoshida ................ | B41J 11/008 |
| 2020/0130264 A1* | 4/2020 | Fukase .................. | B22F 10/20 |
| 2021/0300097 A1* | 9/2021 | Kurane .................. | B41J 29/38 |

* cited by examiner

*Primary Examiner* — Leith S Shafi
*Assistant Examiner* — Tiffany Yu Huang
(74) *Attorney, Agent, or Firm* — Maginot Moore & Beck LLP

(57) ABSTRACT

A material drop ejecting three-dimensional (3D) object printer identifies a time lag error corresponding to a time lag in the response of printer components to component commands. The identified time lag error is provided to a slicer program that uses the identified time lag error to compensate for the time lag in the response of the printer components.

7 Claims, 4 Drawing Sheets

SYSTEM AND METHOD FOR CALIBRATING LAG TIME IN A THREE-DIMENSIONAL OBJECT PRINTER

TECHNICAL FIELD

This disclosure is directed to three-dimensional (3D) object printers that eject drops of material to form three-dimensional (3D) objects and, more particularly, to the calibration of lag time in the movement of the build platform in those printers.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject drops of melted materials, such as photopolymers or elastomers. The printer typically operates one or more ejectors to form successive layers of the thermoplastic material that form a three-dimensional printed object with a variety of shapes and structures. After each layer of the three-dimensional printed object is formed, the plastic material is cured so it hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heating chamber where the solid metal is melted and the melted metal flows into a chamber of the ejector. An uninsulated electrically conducting wire is wrapped around the chamber. An electrical current is passed through the conductor to produce an electromagnetic field that causes the meniscus of the melted metal at a nozzle of the chamber to separate from the melted metal within the chamber and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magnetohydrodynamic printer.

In these known 3D object printers, the printhead and the platform on which the object is formed move relative to one another in an X-Y plane and in a Z plane that is perpendicular to the X-Y plane. A program typically called a slicer processes a three-dimensional model or other digital data model of the object to be produced to generate data identifying each layer of the object and then generate machine-ready instructions for execution by the printer controller in a known manner to operate the components of the printer to move the platform and the printhead relative to one another while operating the printhead to eject drops of material that form the object corresponding to the digital data model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer.

The machine instructions, when executed by the printer controller, generate signals for the actuators that move the printhead and the platform supporting the object and the signals that operate the one or more ejectors in the printhead. Filters for the signals as well as the electrical and mechanical transfer times for operation of the components produce a time lag between the execution of the instructions and the physical movement of the printhead and the object platform. To compensate for this time lag, the timing of the ejector(s) firing can be adjusted provided the time lag is known. Additionally, the length of the time lag is affected by the distance between the printhead and the object surface being printed, the velocity of the drops, and other factors. In order for the printer controller to adjust the operation of the printer components to compensate for the time lag, a time constant is identified during a printer calibration. This calibration typically occurs at the time of printer installation, when components in the printer are changed, or when the time lag changes after a lengthy period of printer operation.

To calibrate a 3D object printer, a pattern of evenly spaced drops are printed and then lines through the centers of the alternating lines of drops are determined as shown in FIGS. 3A and 3B. The pattern in FIG. 3A is the expected pattern of drops ejected by a single ejector that is operated at a set frequency as the platform moves in the X direction from left to right, then the platform moves perpendicularly in the Y direction, then as the ejector is again operated at the same frequency, the platform is moved in the -X direction from right to left, and then the platform moves perpendicularly in the Y direction. This pattern of evenly spaced drops is formed if no time lag is present in the system. The printed pattern that occurs when time lag is present in the system in shown in FIG. 3B. As the figure demonstrates, a centerline between adjacent lines identifies a distance that is twice the error distance caused by the time lag. Thus, $\Delta x_{lag}$ is ½ (error distance) and the time lag is $\Delta x_{lag}/v_b$, where $v_b$ is the velocity of the platform. The time constant for delaying command execution and ejector firing is adjusted and the pattern is printed and analyzed until the time lag is within a predetermined acceptable range about zero. In previously known systems, this calibration procedure was performed manually, which took the system out of operational service for a relatively long period of time and was susceptible to human error. Being able to perform the time lag calibration procedure in less time with more accuracy would be beneficial.

SUMMARY

A new method of operating a material drop ejecting 3D object printer can identify a time constant to compensate for time lag in the printer in less time and with more accuracy than the manual procedure previously performed. The method includes executing machine ready instructions to operate components of the 3D object printer to form a test pattern on a platform within the printer, operating an optical sensor to generate image data of the test pattern on the platform, identifying centerlines through alternating lines of the image data of the test pattern on the platform, identifying a time lag in the 3D object printer using the centerlines and a velocity of platform or ejector head movement during formation of the test pattern, identifying a time constant to compensate for the identified time lag in the 3D object printer, and using the identified time constant to alter generation of machine ready instructions or configuration of the 3D object printer for formation of an object by the 3D object printer.

A new material drop ejecting 3D object printer can identify a time constant to compensate for time lag in the printer in less time and with more accuracy than the manual procedure previously performed. The material drop ejecting 3D object printer includes an ejector head having at least one nozzle that is configured to eject drops of a material, a platform positioned opposite the ejector head, an optical sensor configured to generate image data of the platform, at least one actuator operatively connected to at least one of the platform and the at least one ejector head, the at least one actuator being configured to move the at least one of the platform and the at least one ejector head relative to one another, and a controller operatively connected to the ejector head and the at least one actuator. The controller is configured to execute machine ready instructions to operate the at least one actuator and the ejector head of the 3D object printer to form a test pattern on the platform within the printer, operate the optical sensor to generate image data of the test pattern on the platform, identify centerlines through alternating lines of the image data of the test pattern on the platform, identify a time lag in the 3D object printer using the centerlines and a velocity of platform movement during formation of the test pattern, identify a time constant to compensate for the identified time lag in the 3D object printer, and using the identified time constant to alter generation of machine ready instructions or a configuration of the 3D object printer for formation of an object by the 3D object printer.

BRIEF DESCRIPTION OF THE DRAWINGS

The foregoing aspects and other features of a method of operating a material drop ejecting 3D object printer and new material drop ejecting 3D object printer that identifies a time constant to compensate for time lag in the printer in less time and with more accuracy than the manual procedure previously performed are explained in the following description, taken in connection with the accompanying drawings. The method and printer described below use an optical sensor to generate image data of the test pattern and the controller is configured with programmed instructions that, when executed, process the image data to identify the time lag and a corresponding time constant. This identified time constant is then used to operate the components of the printer to compensate for the time lag.

DETAILED DESCRIPTION

Figure 1:
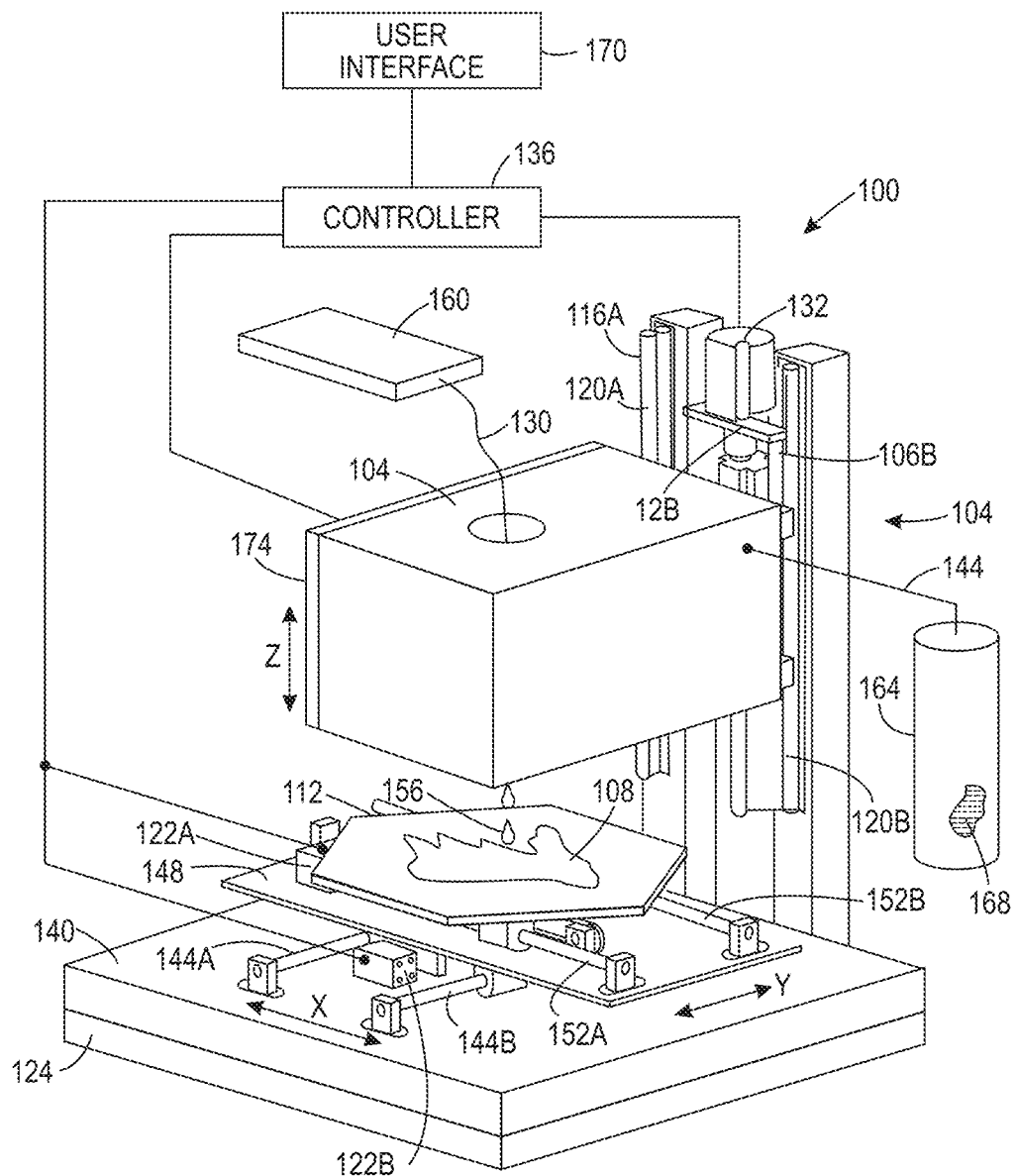
FIG. 1 depicts a metal drop ejecting 3D metal object printer that identifies a time constant to compensate for time lag in the printer in less time and with more accuracy than the manual procedure previously performed.

For a general understanding of a 3D object printer and its operation that identifies a time constant to compensate for time lag in the printer in less time and with more accuracy than the manual procedure previously performed, reference is made to the drawings. In the drawings, like reference numerals designate like elements.

FIG. 1 illustrates an embodiment of a melted metal 3D object printer 100 that is equipped with an optical sensor 174 and the controller 136 is configured with a calibration program to identify a time constant to compensate for time lag in the printer in less time and with more accuracy than the manual procedure previously performed. Although the description below is made with reference to the metal drop ejecting 3D object printer of FIG. 1, the optical sensor 174 and controller 136 configured with the calibration program can be used with a single nozzle or multi-nozzle 3D object printer that ejects drops of other materials, such as thermoplastic material. The optical sensor can be, for example, a Gocator optical sensor available from LMI Technologies of Burnaby, British Columbia, Canada.

In the printer of FIG. 1, drops of melted bulk metal are ejected from a ejector head 104 having a single nozzle and drops from the nozzle form lines for layers of an object 108 on a platform 112. As used in this document, the term "bulk metal" means conductive metal available in aggregate form, such as wire of a commonly available gauge or pellets of macro-sized proportions. A source of bulk metal 160, such as metal wire 130, is fed into the ejector head and melted to provide melted metal for a chamber within the ejector head. An inert gas supply 164 provides a pressure regulated source of an inert gas 168, such as argon, to the chamber of melted metal in the ejector head 104 through a gas supply tube 144 to prevent the formation of metal oxide in the ejector head.

The ejector head 104 is movably mounted within Z-axis tracks 116A and 116B in a pair of vertically oriented members 120A and 120B, respectively. Members 120A and 120B are connected at one end to one side of a frame 124 and at another end to one another by a horizontal member 128. An actuator 132 is mounted to the horizontal member 128 and operatively connected to the ejector head 104 to move the ejector head along the Z-axis tracks 116A and 166B. The actuator 132 is operated by a controller 136 to maintain a distance between the single nozzle of the ejector head 104 and an uppermost surface of the object 108 on the platform 112.

Mounted to the frame 124 is a planar member 140, which can be formed of granite or other sturdy material to provide reliably solid support for movement of the platform 112. Platform 112 is affixed to X-axis tracks 144A and 144B so the platform 112 can move bidirectionally along an X-axis as shown in the figure. The X-axis tracks 144A and 144B are affixed to a stage 148 and stage 148 is affixed to Y-axis tracks 152A and 152B so the stage 148 can move bidirectionally along a Y-axis as shown in the figure. Actuator 122A is operatively connected to the platform 112 and actuator 122B is operatively connected to the stage 148. Controller 136 operates the actuators 122A and 122B to move the platform along the X-axis and to move the stage 148 along the Y-axis to move the platform in an X-Y plane that is opposite the ejector head 104. Performing this X-Y planar movement of platform 112 as drops of molten metal 156 are ejected toward the platform 112 forms a line of melted metal drops on the object 108. Controller 136 also operates actuator 132 to adjust the vertical distance between the ejector head 104 and the most recently formed layer on the substrate to facilitate formation of other structures on the object. While the molten metal 3D object printer 100 is depicted in FIG. 1 as being operated in a vertical orientation, other alternative orientations can be employed. Also, while the embodiment shown in FIG. 1 has a platform that moves in an X-Y plane and the ejector head moves along the Z axis, other arrangements are possible. For example, the ejector head 104 can be configured for movement in the X-Y plane and along the Z axis.

The controller 136 can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 136 from either a scanning system or an online or work station connection for processing and generation of the ejector head control signals output to the ejector head 104.

The controller 136 of the melted metal 3D object printer 100 requires data from external sources to control the printer for metal object manufacture. In general, a three-dimensional model or other digital data model of the object to be formed is stored in a memory operatively connected to the controller 136, or the controller can access through a server or the like a remote database in which the digital data model is stored, or a computer-readable medium in which the digital data model is stored can be selectively coupled to the controller 136 for access. This three-dimensional model or other digital data model is processed by a slicer implemented with the controller to produce data identifying each layer of an object and then generate machine-ready instructions for execution by the controller 136 in a known manner to operate the components of the printer 100 and form the metal object corresponding to the model. The generation of the machine-ready instructions can include the production of intermediate models, such as when a CAD digital data model for an object is converted into a STL object layer data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 136 executes the machine-ready instructions to control the ejection of the melted metal drops from the ejector head 104, the positioning of stage 148 and the platform 112, as well as the distance between the ejector head 102 and the uppermost layer of the object 108 on the platform 112.

In a similar manner, the slicer is provided with digital data for a test pattern that is used to calibrate a time constant for the printer that compensates for time lag in the printer. The slicer generates the 3D object layer data used to generate the machine-ready instructions that operate the components of the printer to form the test pattern on the platform 112 corresponding to the digital data for the test pattern. A commonly used format for a digital data model is the STL format but other formats, such as 3MF, AMF, and PLY can be used. In the STL format, an object surface is defined by the edges and corners of triangular faces. The slicer converts these STL data into a two-dimensional (2D) test pattern and then generates the machine-ready instructions that operate the actuators to move the platform head along tool paths and that operate the ejector head to eject metal drops to form the test pattern. After the test pattern is formed on the platform, the optical sensor 174 is operated by the controller 136 to generate image data of the test pattern on the platform 112. The controller then analyzes the image data by projecting lines through the center of alternating lines and measuring the distance between these centerlines. As noted previously, this distance is twice the error caused by the time lag in the printer. This identified error is then used to identify the time lag since the time lag is the error distance is divided by the velocity of the platform during the printing of the test pattern. A time delay constant is then derived from the identified time lag. Since the spatial time delay is the distance between the centerlines of the drop columns ($dist_{cl}$), the time delay constant is identified by the equation: time delay constant=$dist_{cl}/(2*vel)$, where vel is the velocity of the platform or ejector head.

The time delay constant described in the previous paragraph is identified using a constant velocity of the platform or ejector so it is useful for operating the 3D object printer during the portions of printer operation where the speed of the ejector head or platform movement is constant. In areas where the ejector head or platform is accelerated or decelerated, other delay parameters need to be identified.

Figure 2:
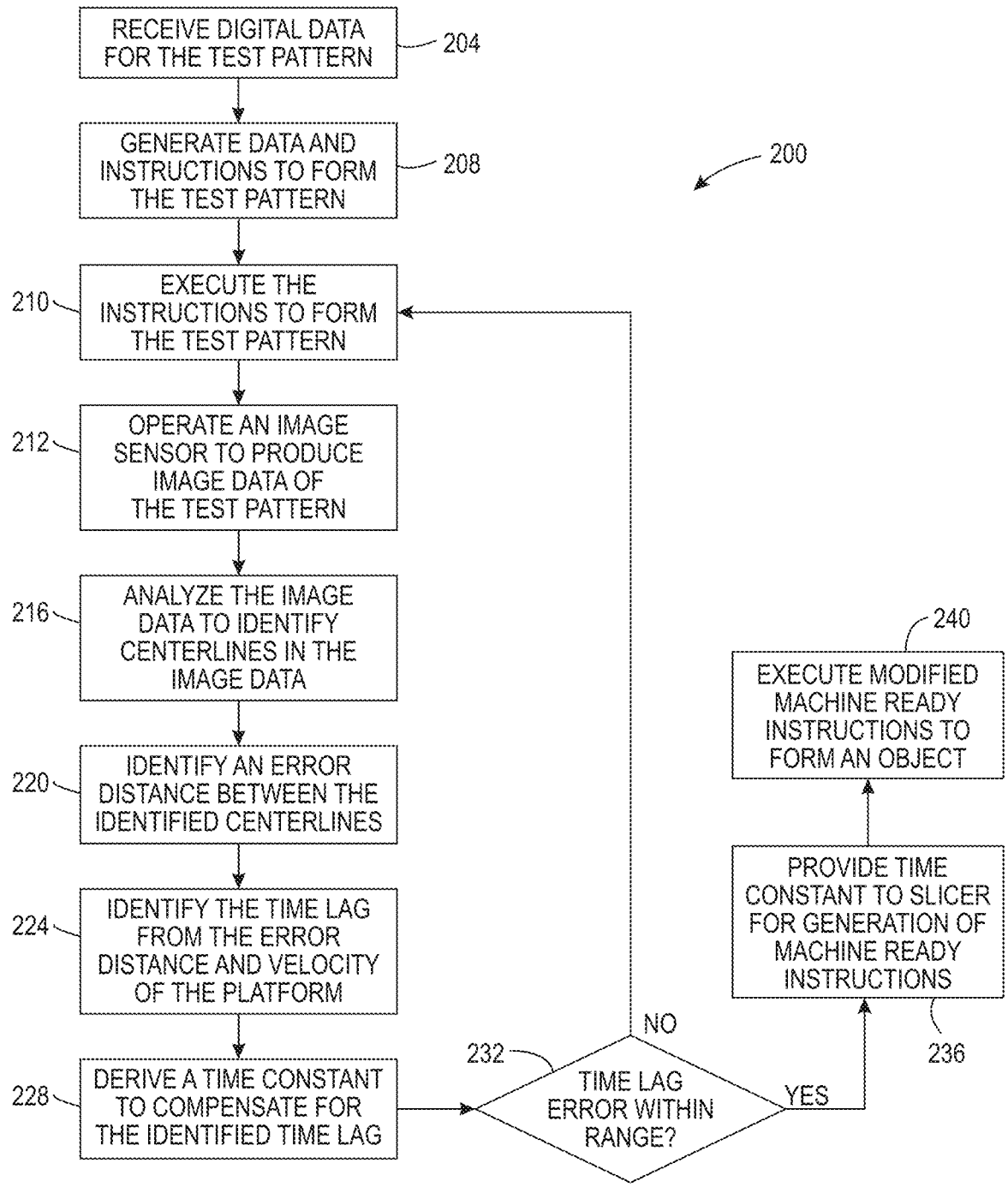
FIG. 2 is a flow diagram of a process implemented by a controller that operates the components of the printer shown in FIG. 1 to identify a time constant that is used to compensate for time lag in the printer.
Figure 3A:
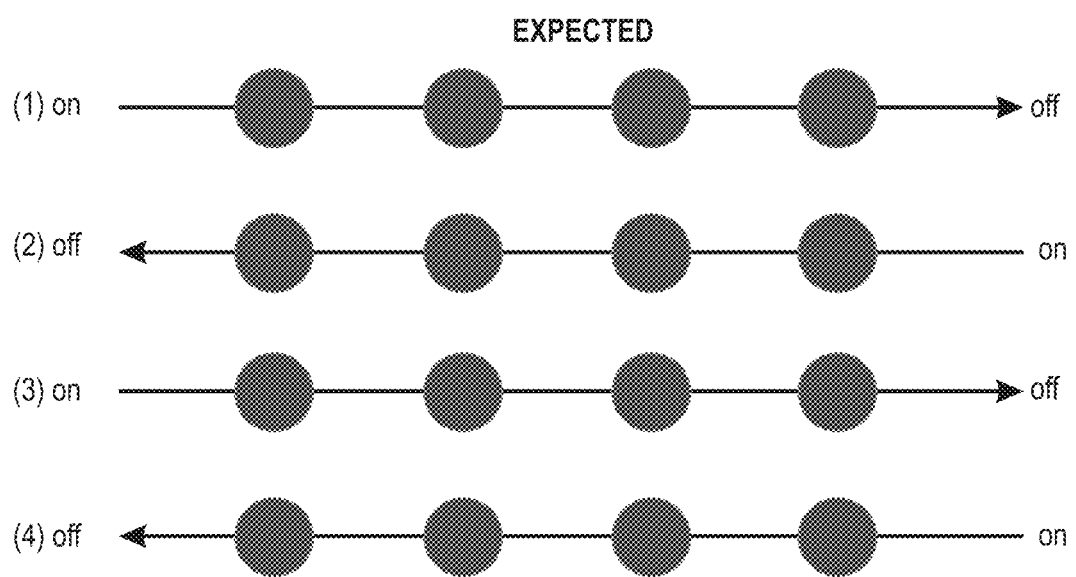
FIG. 3A shows a printed test pattern produced by a printer without any time lag and FIG. 3B shows a printed test pattern produced by a printer having time lag between the execution of the commands for operating the components of the printer and the actual operation of the components.
Figure 3B:
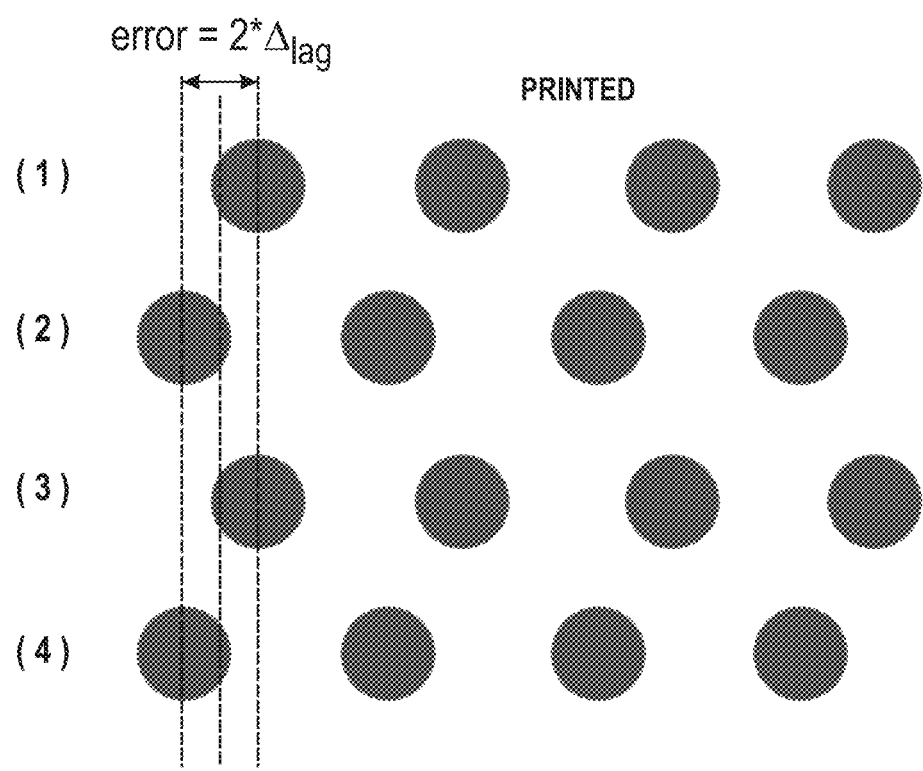

A process for operating a material drop ejecting 3D object printer to identify a time constant to compensate for time lag in the printer in less time and with more accuracy than the manual procedure previously performed is shown in FIG. 2. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 136 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 2 is a flow diagram of a process that operates a material drop ejecting 3D object printer, such as printer 10, to identify a time constant to compensate for time lag in the printer in less time and with more accuracy than the manual procedure previously performed. The process 200 begins with the slicer receiving the digital data model for the test pattern to be produced (block 204). The slicer then generates object layer data and machine ready instructions for forming the test pattern (block 208) that are executed by the controller to operate the printer and form the test pattern on the platform 112 (block 210). The optical sensor 174 is operated while the platform is moved beneath the sensor so the sensor generates image data of the test pattern (block 212). The controller then analyzes the image data to identify centerlines through alternating lines of the test pattern (block 216). An error distance between the identified centerlines is identified (block 220) and the error distance is divided in half to identify the time lag error and the time lag error is divided by the velocity of the platform while it was moved during the formation of the test pattern to identify the time lag (block 224). A time constant for compensating for the time lag error is derived from the time lag error (block 228) and the process of printing and analyzing the test pattern (blocks 208 to 228) is repeated until the time lag error is within a predetermined range about zero (block 232). In one embodiment, the predetermined range is ±⅛ (the drop diameter). This time constant is used to alter the generation of machine ready instructions for forming an object or for altering a configuration of the printer (block 236). As used in this document, the term "altering a configuration of the printer" means providing the identified time constant to the controller, which uses the time constant during execution of the previously generated machine ready instructions to compensate for the time lag error. The controller either executes the machine ready instructions generated using the identified time constant or the controller uses the time constant during the execution of previously generated machine ready instructions to compensate for the time lag and form an object without the adverse effects that the time lag error would otherwise produce (block 240).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A material drop ejecting 3D object printer comprising:
an ejector head having a single nozzle that is configured to eject drops of a material;
a platform positioned opposite the ejector head;
an optical sensor configured to generate image data of the platform and drops of material ejected onto the platform;
at least one actuator operatively connected to the platform or the ejector head, the at least one actuator being configured to move the platform and the ejector head relative to one another in a plane that is parallel to the platform;
and a controller operatively connected to the ejector head and the at least one actuator, the controller being configured to:
execute machine ready instructions to operate the at least one actuator and the ejector head of the 3D object printer to move the ejector head bidirectionally relative to the platform while the ejector head ejects a plurality of drops from the single nozzle to form a test pattern having at least two lines of separated drops on the platform within the printer;
operate the optical sensor to generate image data of the test pattern on the platform;
identify centerlines through alternating lines of the image data of the separated drops of the at least two lines of separated drops test pattern on the platform;
identify a time lag error in the 3D object printer using the identified centerlines and a velocity of the platform or the ejector head movement during formation of the test pattern, wherein identifying a time lag error comprising:
identifying a first distance between adjacent centerlines in the image data of the separated drops in the at least two lines of the test pattern, dividing the first distance in half, and dividing the one-half of the first distance by the velocity of the platform or the ejector head movement during formation of the test pattern;
identify a time constant to compensate for the identified time lag error in the 3D object printer;
and use the identified time constant to alter generation of machine ready instructions or a configuration of the 3D object printer for formation of an object by the 3D object printer.

2. The printer of claim 1, wherein the velocity of the platform or ejector head movement is constant.

3. The printer of claim 1, the controller being further configured to: compare the time lag error to a time lag error range; and iteratively repeat the formation of the test pattern, the operation of the optical sensor, the identification of the time lag error, and the identification of the time constant until the time lag error is within the time lag error range.

4. The printer of claim 3, the controller being further configured to:
identify the time lag error by dividing the first distance in half and dividing the one-half of the first distance by the velocity of the platform or the ejector head movement during formation of the test pattern.

5. The printer of claim 4 wherein the velocity of the platform or the ejector head is constant.

6. The printer of claim 5 wherein the time lag error range is ±⅛ of a diameter of a drop forming the test pattern.

7. The printer of claim 1, the controller being further configured to:
generate machine ready instructions to operate the material drop ejecting 3D object printer using the identified time constant.

* * * * *